(12) United States Patent
Takahashi et al.

(10) Patent No.: US 12,728,573 B2
(45) Date of Patent: Sep. 8, 2026

(54) MOLD AND INJECTION MOLDING DEVICE EVALUATION METHOD

(71) Applicant: SEIKO EPSON CORPORATION, Tokyo (JP)

(72) Inventors: Masayuki Takahashi, Shiojiri (JP); Kakeru Sasagawa, Matsumoto (JP); Juri Yamaguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 330 days.

(21) Appl. No.: 18/535,657

(22) Filed: Dec. 11, 2023

(65) Prior Publication Data

US 2024/0190054 A1 Jun. 13, 2024

(30) Foreign Application Priority Data

Dec. 13, 2022 (JP) ................................ 2022-198636

(51) Int. Cl.
*B29C 45/10* (2006.01)
*B29C 45/04* (2006.01)
*B29C 45/26* (2006.01)

(52) U.S. Cl.
CPC .......... *B29C 45/0416* (2013.01); *B29C 45/10* (2013.01); *B29C 45/2602* (2013.01); *B29K 2995/007* (2013.01)

(58) Field of Classification Search
None
See application file for complete search history.

(56) References Cited

U.S. PATENT DOCUMENTS 3,830,613 A * 8/1974 Aoki .................. B29C 45/1781 425/DIG. 221
5,650,177 A * 7/1997 Kojima .................. B29C 33/56 264/272.17
2005/0191383 A1* 9/2005 Goinski ............... B29C 45/278 425/569
2017/0259481 A1* 9/2017 Slisse ..................... B29C 45/28
2022/0063143 A1 3/2022 Anegawa

FOREIGN PATENT DOCUMENTS

JP 3137778 U * 12/2007
JP 2012-131115 A 7/2012
JP 2022-038683 A 3/2022

* cited by examiner

*Primary Examiner* — Thu Khanh T. Nguyen
(74) *Attorney, Agent, or Firm* — WORKMAN NYDEGGER

(57) ABSTRACT

A mold includes: a fixed mold; a movable mold facing the fixed mold; a first plate having a first opening into which the fixed mold is incorporated and fixing the fixed mold; and a second plate having a second opening into which the movable mold is incorporated and fixing the movable mold. The fixed mold and the movable mold define a cavity. The fixed mold and the movable mold are sized for attachment to a first injection molding device, and the first plate and the second plate are sized for attachment to a second injection molding device different from the first injection molding device.

5 Claims, 8 Drawing Sheets

MOLD AND INJECTION MOLDING DEVICE EVALUATION METHOD

The present application is based on, and claims priority from JP Application Serial Number 2022-198636, filed Dec. 13, 2022, the disclosure of which is hereby incorporated by reference herein in its entirety.

BACKGROUND

1. Technical Field

The present disclosure relates to a mold and an injection molding device evaluation method.

2. Related Art

There is an injection molding device which injects a plasticized material toward a cavity of a mold and cures the plasticized material to mold a molded product.

For example, JP-A-2012-131115 discloses an injection molding device including a scroll in which a spiral groove is formed and which has a substantially short columnar shape, and a substantially disk-shaped barrel in which a heater is embedded. In JP-A-2012-131115, a mold is a cassette mold including a movable mold piece attached to a movable die plate and a fixed mold piece attached to a fixed die plate.

As described above, the mold for injection molding is used by being attached to the injection molding device, but it is desired that the mold for injection molding can be used in other injection molding devices when the injection molding device to be used fails or when specifications of the injection molding device are desired to be evaluated.

SUMMARY

One aspect of a mold according to the present disclosure includes: a fixed mold; a movable mold facing the fixed mold; a first plate having a first opening into which the fixed mold is incorporated and fixing the fixed mold; and a second plate having a second opening into which the movable mold is incorporated and fixing the movable mold. The fixed mold and the movable mold define a cavity. The fixed mold and the movable mold are sized for attachment to a first injection molding device, and the first plate and the second plate are sized for attachment to a second injection molding device different from the first injection molding device.

One aspect of an injection molding device evaluation method according to the present disclosure includes: forming a first molded product by injecting a molding material toward the cavity from the first injection molding device to which the fixed mold and the movable mold are attached in a first state; forming a second molded product by injecting a molding material toward the cavity from the second injection molding device to which the fixed mold and the movable mold are attached in a second state; and evaluating at least one of the first injection molding device and the second injection molding device by comparing the first molded product and the second molded product.

BRIEF DESCRIPTION OF THE DRAWINGS

FIG. 4 is a schematic view showing a barrel of the injection molding device according to the embodiment.

DESCRIPTION OF EMBODIMENTS

Hereinafter, a preferred embodiment of the present disclosure will be described in detail with reference to drawings. The embodiment described below does not unduly limit contents of the present disclosure described in the claims. Further, all of configurations to be described below are not necessarily essential elements of the present disclosure.

1. Injection Molding Device 1.1. Overall Configuration

Figure 1:
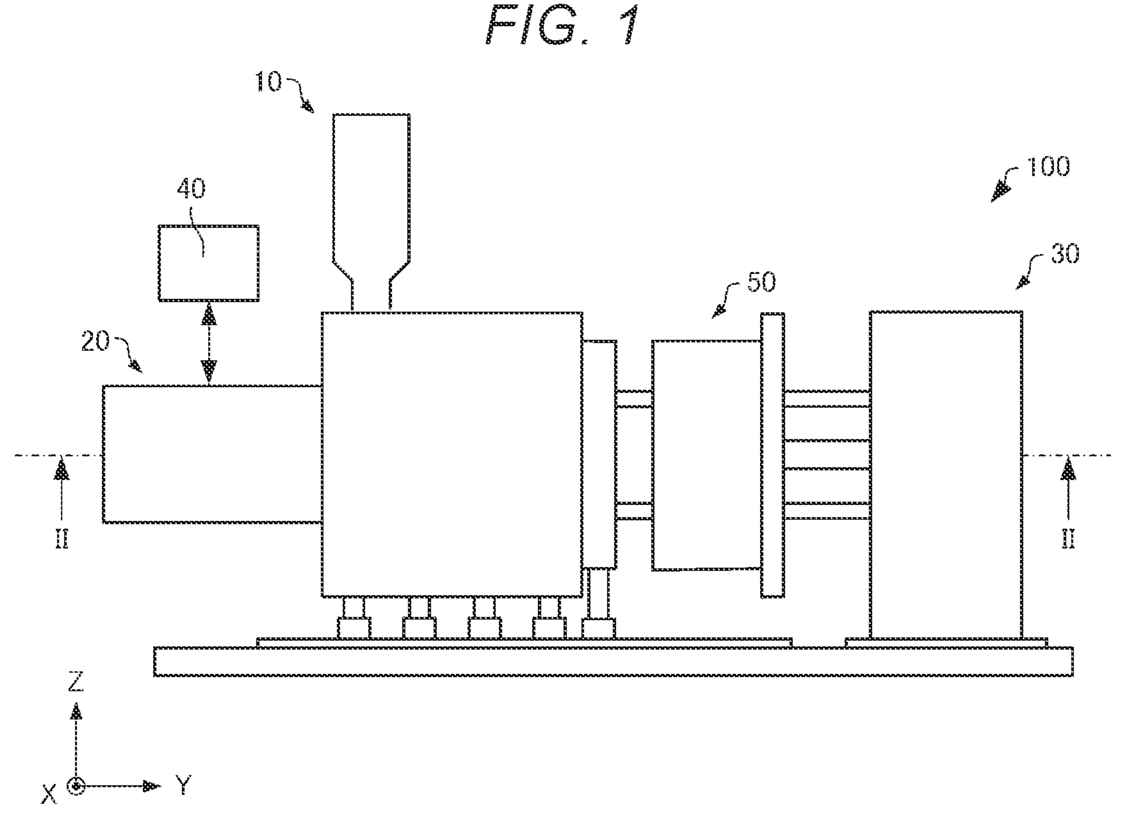
FIG. 1 is a side view schematically showing an injection molding device according to an embodiment.

First, an injection molding device according to the embodiment will be described with reference to the drawings. FIG. 1 is a side view schematically showing an injection molding device 100 according to the embodiment. FIG. 1 shows an X axis, a Y axis, and a Z axis as three axes orthogonal to one another. An X-axis direction and a Y-axis direction are, for example, horizontal directions. A Z-axis direction is, for example, a vertical direction.

As shown in FIG. 1, the injection molding device 100 includes, for example, a material supply unit 10, an injection unit 20, a mold clamping unit 30, and a control unit 40.

The material supply unit 10 supplies a material serving as a raw material to the injection unit 20. The material supply unit 10 is implemented by, for example, a hopper. A shape of the material supplied from the material supply unit 10 is, for example, a pellet shape or a powder shape. The material supplied by the material supply unit 10 is, for example, an acrylonitrile butadiene styrene (ABS) resin.

The injection unit 20 plasticizes the material supplied from the material supply unit 10 into a molding material. Then, the injection unit 20 injects the plasticized molding material toward a cavity of a mold 50.

The term "plasticize" is a concept including melting, and refers to changing from a solid state to a state of presenting fluidity. Specifically, in a case of a material in which glass transition occurs, the term "plasticize" refers to setting a temperature of the material to be equal to or higher than a glass transition point. In a case of a material in which the glass transition does not occur, the term "plasticize" refers to setting a temperature of the material to be equal to or higher than a melting point thereof.

The mold clamping unit 30 opens and closes the mold 50 attached to the injection molding device 100. The mold clamping unit 30 opens the mold 50 after the molding material is cooled and solidified. Accordingly, the molded product is discharged to outside.

The control unit 40 is implemented by, for example, a computer including a processor, a main storage device, and an input and output interface for inputting a signal from the outside and outputting a signal to the outside. The control unit 40 implements various functions by, for example, the processor executing a program loaded into the main storage device. Specifically, the control unit 40 controls the injection unit 20 and the mold clamping unit 30. The control unit 40 may be implemented by a combination of a plurality of circuits instead of the computer.

1.2. Specific Configuration

Figure 2:
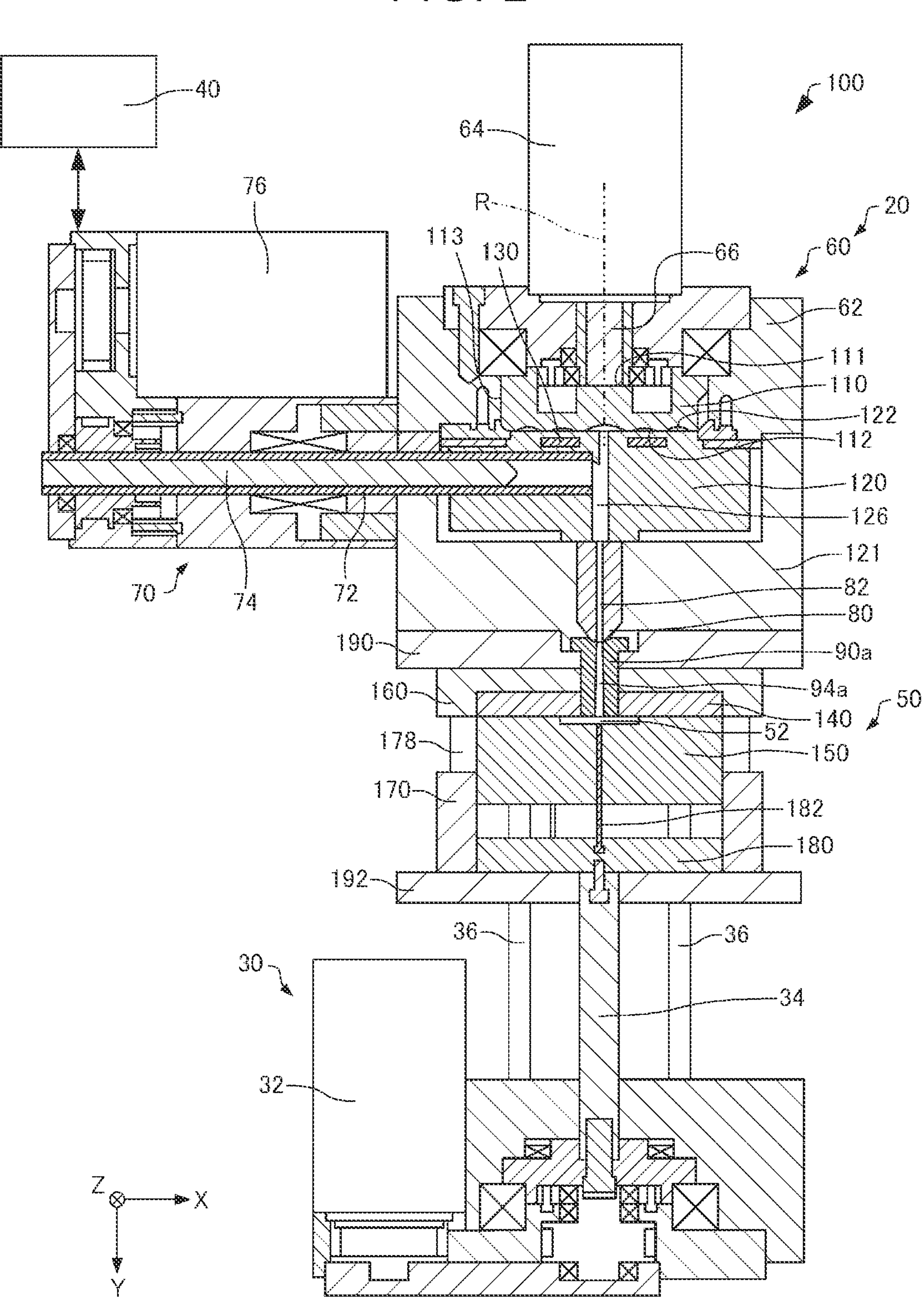
FIG. 2 is a cross-sectional view schematically showing the injection molding device according to the embodiment.

FIG. 2 is a cross-sectional view schematically showing the injection molding device 100 taken along a line II-II in FIG. 1. As shown in FIG. 2, the injection unit 20 includes, for example, a plasticizing unit 60, an injection mechanism 70, and a nozzle 80.

The plasticizing unit 60 plasticizes the material supplied from the material supply unit 10, generates a paste-shaped molding material having fluidity, and guides the molding material to the injection mechanism 70. The plasticizing unit 60 includes, for example, a screw case 62, a drive motor 64, a flat screw 110, a barrel 120, a barrel case 121, and a heater 130.

The screw case 62 is a housing that accommodates the flat screw 110. The flat screw 110 is accommodated in a space surrounded by the screw case 62 and the barrel 120.

The drive motor 64 is coupled to the screw case 62. The drive motor 64 rotates the flat screw 110. The drive motor 64 is, for example, a servomotor. A shaft 66 of the drive motor 64 is coupled to the flat screw 110. The drive motor 64 is controlled by the control unit 40.

Figure 3:
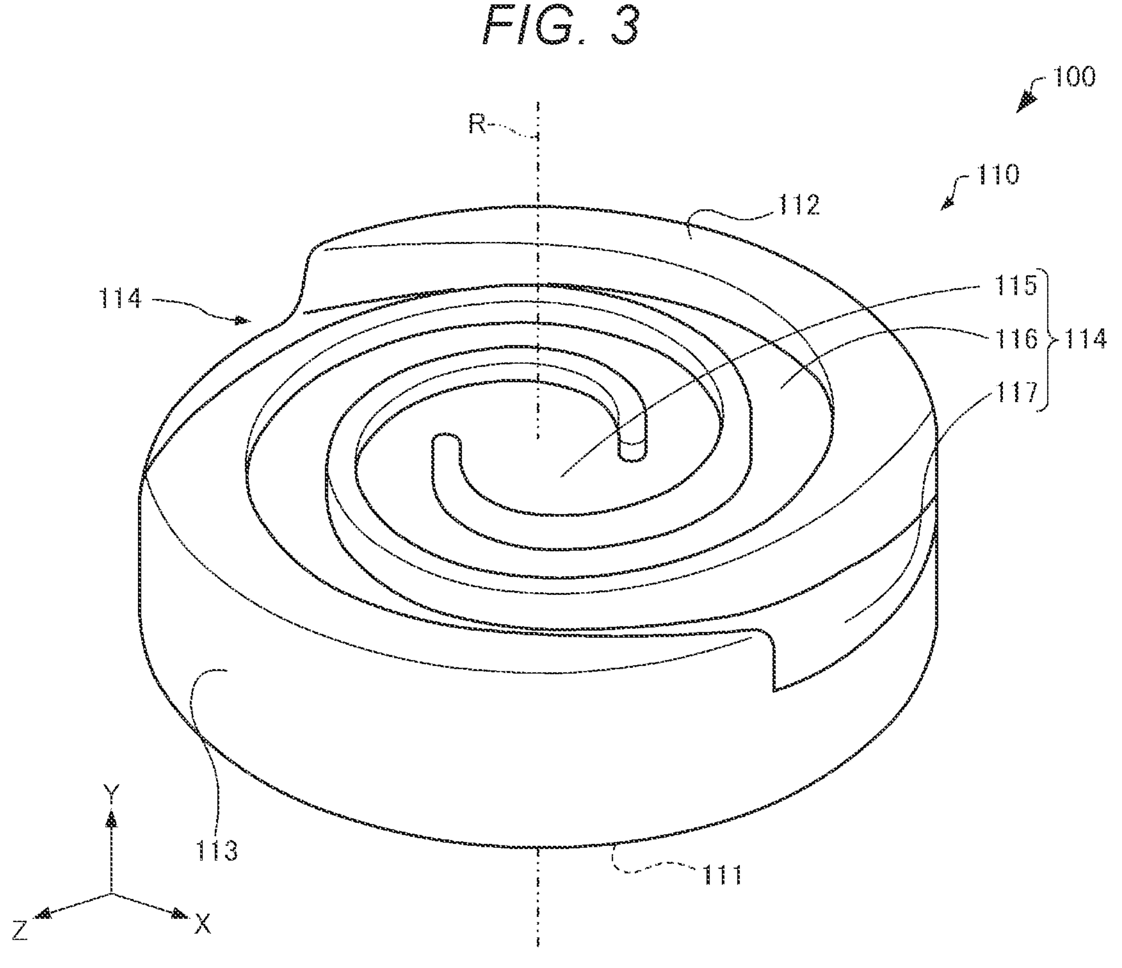
FIG. 3 is a perspective view schematically showing a flat screw of the injection molding device according to the embodiment.

The flat screw 110 has a substantially columnar shape in which a size in a direction along a rotation axis R is smaller than a size in a direction orthogonal to the direction along the rotation axis R. In the shown example, the direction along the rotation axis R is the Y-axis direction. The flat screw 110 is rotated about the rotation axis R by a torque generated by the drive motor 64. The flat screw 110 has a main surface 111, a groove forming surface 112 opposite to the main surface 111, and a coupling surface 113 coupling the main surface 111 and the groove forming surface 112. Here, FIG. 3 is a perspective view schematically showing the flat screw 110. For convenience, FIG. 3 shows a state in which an upper-lower positional relationship is reversed from a state shown in FIG. 2.

As shown in FIG. 3, first grooves 114 are formed in the groove forming surface 112 of the flat screw 110. The first groove 114 includes, for example, a central portion 115, a coupling portion 116, and a material introduction portion 117. The central portion 115 faces a communication hole 126 formed in the barrel 120. The central portion 115 communicates with the communication hole 126. The coupling portion 116 couples the central portion 115 and the material introduction portion 117. In the shown example, the coupling portion 116 is formed in a spiral shape from the central portion 115 toward an outer periphery of the groove forming surface 112. The material introduction portion 117 is formed at the outer periphery of the groove forming surface 112. That is, the material introduction portion 117 is formed at the coupling surface 113 of the flat screw 110. The material supplied from the material supply unit 10 is introduced from the material introduction portion 117 into the first groove 114, passes through the coupling portion 116 and the central portion 115, and is conveyed to the communication hole 126 formed in the barrel 120. In the shown example, two first grooves 114 are formed.

The number of the first grooves 114 is not particularly limited. Although not shown, three or more first grooves 114 may be provided, or only one first groove 114 may be provided.

Although not shown, the plasticizing unit 60 may include an elongated in-line screw having a spiral groove on a side surface thereof instead of the flat screw 110. Further, the plasticizing unit 60 may plasticize the material by rotation of the in-line screw.

As shown in FIG. 2, the barrel 120 faces the flat screw 110. In the shown example, the barrel 120 is accommodated in the barrel case 121. The barrel 120 has a facing surface 122 facing the groove forming surface 112 of the flat screw 110. The facing surface 122 faces the groove forming surface 112 in the Y-axis direction. The communication hole 126 is formed at a center of the facing surface 122. Here, FIG. 4 is a schematic view showing the barrel 120.

Figure 4:
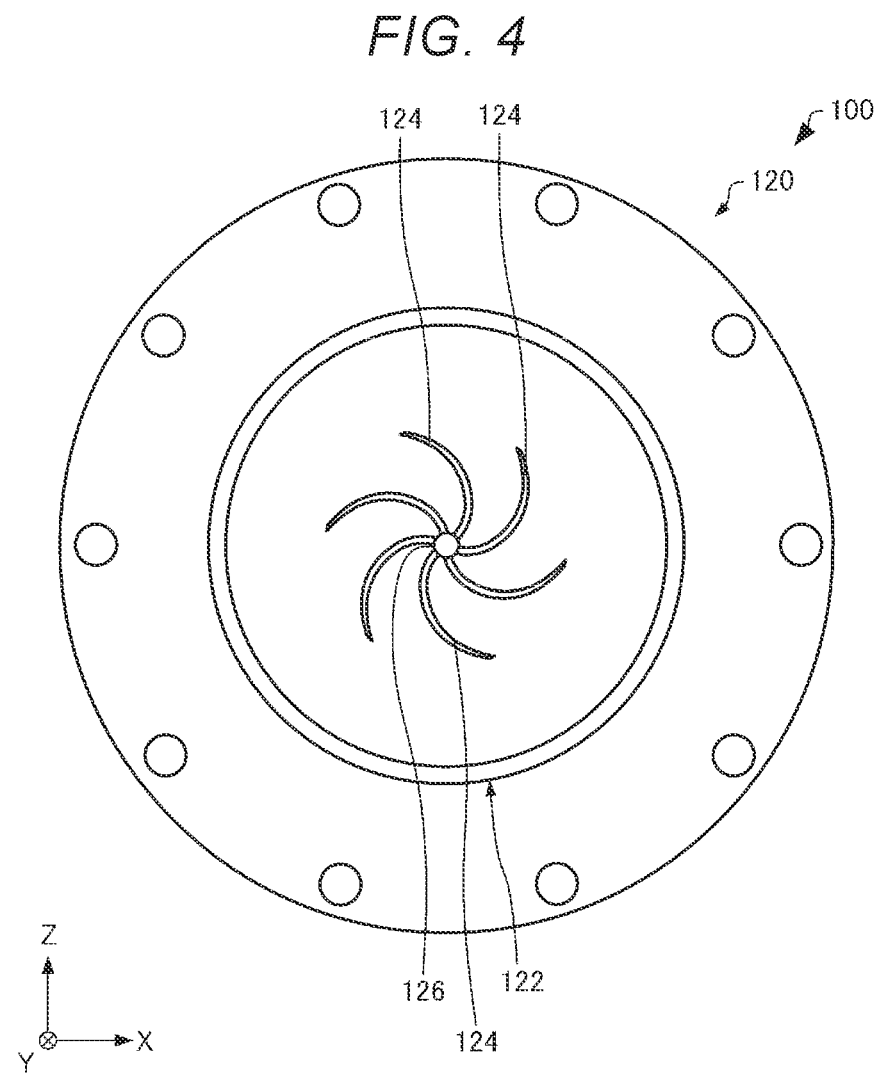

As shown in FIG. 4, second grooves 124 and the communication hole 126 are formed in the facing surface 122 of the barrel 120. A plurality of the second grooves 124 are formed. In the shown example, six second grooves 124 are formed, and the number of the second grooves 124 is not particularly limited. The plurality of second grooves 124 are formed around the communication hole 126 when viewed from the Y-axis direction. One end of the second groove 124 is coupled to the communication hole 126, and the second groove 124 extends spirally from the communication hole 126 toward an outer periphery of the facing surface 122. The second groove 124 has a function of guiding the molding material to the communication hole 126. The communication hole 126 allows the plasticized material to flow out of the barrel 120.

A shape of the second groove 124 is not particularly limited, and may be, for example, a linear shape. Further, the one end of the second groove 124 may not be coupled to the communication hole 126. Further, the second groove 124 may not be formed in the facing surface 122. However, in consideration of efficiently guiding the molding material to the communication hole 126, the second groove 124 is preferably formed in the facing surface 122.

As shown in FIG. 2, the heater 130 is provided in the barrel 120. The heater 130 heats the material supplied between the flat screw 110 and the barrel 120. The heater 130 heats the material supplied to the first grooves 114. The heater 130 is controlled by the control unit 40. The plasticizing unit 60 generates the molding material by heating the material while conveying the material toward the communication hole 126 by the flat screw 110, the barrel 120, and the heater 130, and causes the generated molding material to flow out from the communication hole 126 to the injection mechanism 70. The heater 130 may be provided, for example, below the barrel 120 instead of in the barrel 120.

The injection mechanism 70 includes, for example, a cylinder 72, a plunger 74, and a plunger drive motor 76. The cylinder 72 is a substantially cylindrical member coupled to the communication hole 126. The plunger 74 moves in the cylinder 72. The plunger 74 is driven by the plunger drive motor 76. The plunger drive motor 76 is controlled by the control unit 40. The cylinder 72 may be coupled to a flow path downstream of the communication hole 126.

The injection mechanism 70 executes a metering operation and an injection operation by sliding the plunger 74 in the cylinder 72. The metering operation refers to an operation of guiding the molding material located in the communication hole 126 into the cylinder 72 by moving the plunger 74 in an −X-axis direction away from the communication hole 126 and performing metering in the cylinder 72. The injection operation refers to an operation of injecting the molding material in the cylinder 72 into a cavity 52 of the mold 50 through the nozzle 80 by moving the plunger 74 in a +X axis direction approaching the communication hole 126.

A nozzle hole 82 communicating with the communication hole 126 is formed in the nozzle 80. The nozzle 80 injects the molding material supplied from the plasticizing unit 60 toward the cavity 52. Specifically, the molding material metered in the cylinder 72 is sent from the injection mechanism 70 to the nozzle hole 82 through the communication hole 126 by executing the metering operation and the injection operation described above. Then, the molding material is injected from the nozzle hole 82 into the cavity 52.

The mold clamping unit 30 includes, for example, a mold drive unit 32 and a ball screw unit 34. The mold drive unit 32 includes, for example, a motor and a gear. The mold drive unit 32 is coupled to the mold 50 through the ball screw unit 34. The mold drive unit 32 is controlled by the control unit 40. The ball screw unit 34 transmits power generated by driving of the mold drive unit 32 to a movable mold 150 of the mold 50. The mold clamping unit 30 opens and closes the mold 50 by moving the movable mold 150 by the mold drive unit 32 and the ball screw unit 34.

1.3. Mold

Figure 5:
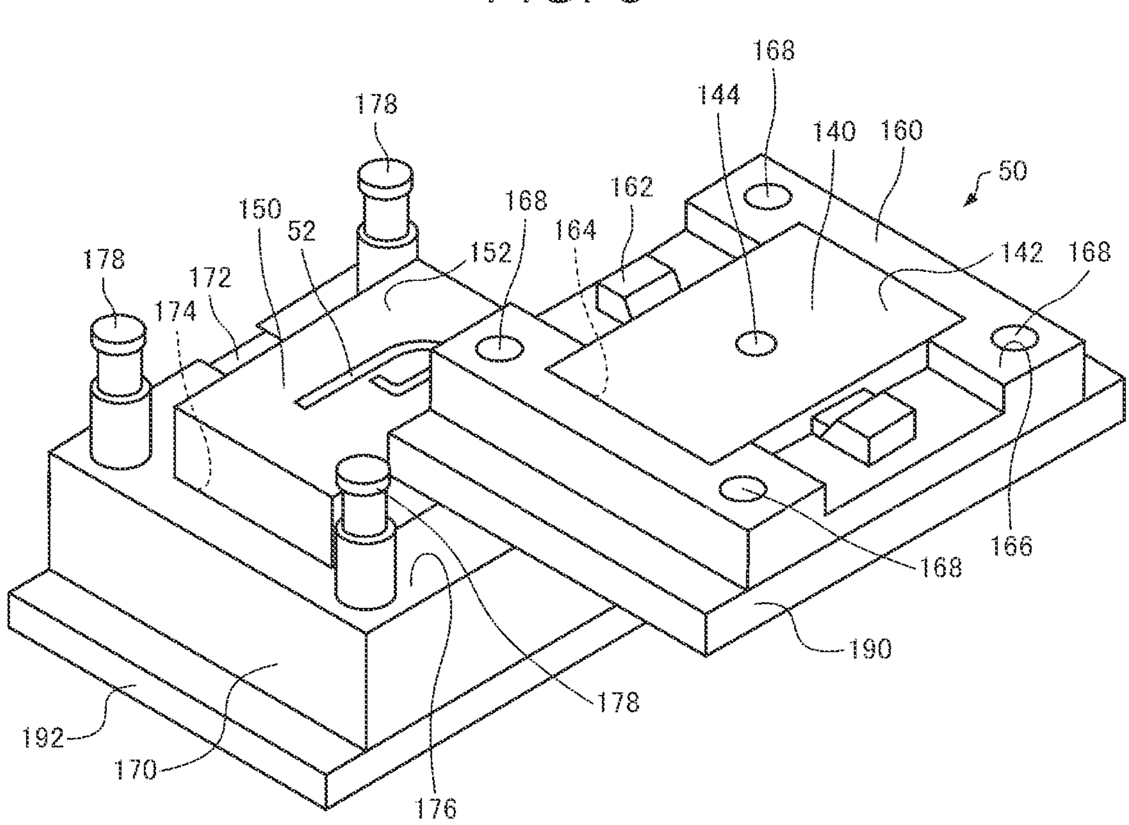
FIG. 5 is a perspective view schematically showing a mold according to the embodiment.
Figure 6:
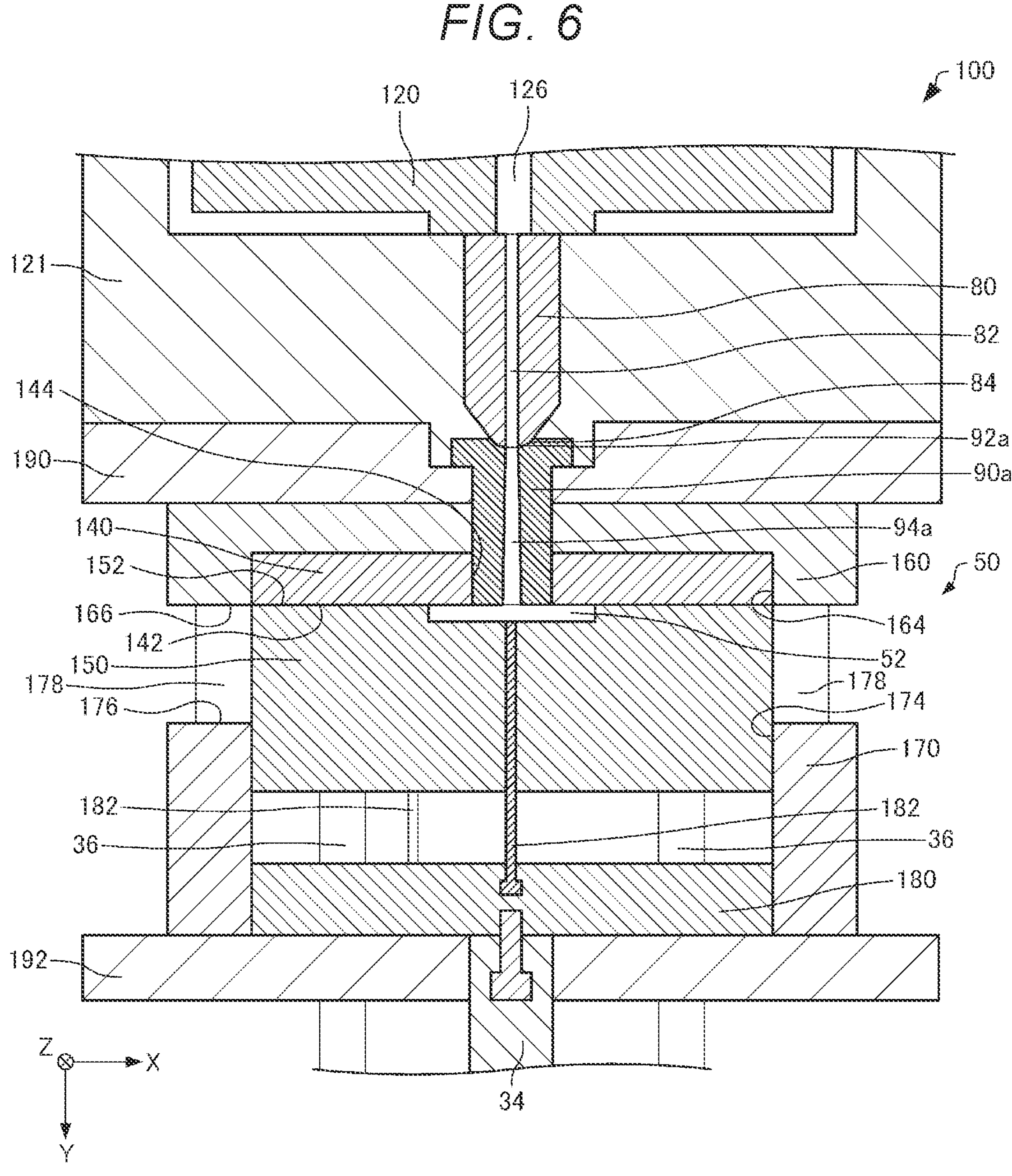
FIG. 6 is a cross-sectional view schematically showing the injection molding device according to the embodiment.

FIG. 5 is an exploded perspective view schematically showing the mold 50. FIG. 6 is an enlarged view showing the vicinity of the mold 50 attached to the injection molding device 100 shown in FIG. 2.

As shown in FIGS. 5 and 6, the mold 50 includes, for example, a fixed mold 140, the movable mold 150, a first plate 160, a second plate 170, a substrate 180, a first support plate 190, and a second support plate 192.

As shown in FIG. 6, the fixed mold 140 is fixed to the barrel case 121 through the first support plate 190. The fixed mold 140 and the movable mold 150 define the cavity 52. The cavity 52 is a space corresponding to a shape of the molded product.

The fixed mold 140 has a first cavity surface 142. The first cavity surface 142 defines the cavity 52. In the example shown in FIG. 6, the first cavity surface 142 faces a +Y-axis direction.

An opening 144 is formed in the fixed mold 140. The opening 144 penetrates the fixed mold 140. A nozzle contact portion 90*a* in contact with the nozzle 80 of the injection molding device 100 is fitted into the opening 144. The nozzle contact portion 90*a* corresponds to a shape of the nozzle 80. Specifically, the nozzle contact portion 90*a* has an engagement portion 92*a* that engages with a tip end 84 of the nozzle 80. The engagement portion 92*a* is in contact with the tip end 84. A flow path 94*a* is formed in the nozzle contact portion 90*a* and allows the nozzle hole 82 to communicate with the cavity 52. The molding material is injected into the cavity 52 from the nozzle hole 82 through the flow path 94*a*. The nozzle contact portion 90*a* may be a hot runner or a cold runner.

A material for the fixed mold 140 is, for example, a metal such as alloy steel, or a ceramic. Examples of the alloy steel used for the fixed mold 140 include NAK (registered trademark) to which nickel, aluminum, and copper are added.

The movable mold 150 faces the fixed mold 140. The movable mold 150 is moved along tie bars 36 by the mold clamping unit 30. In the shown example, the movable mold 150 moves in the Y-axis direction. The movable mold 150 advances and retreats with respect to the fixed mold 140.

The movable mold 150 has a second cavity surface 152. The second cavity surface 152 defines the cavity 52. In the example shown in FIG. 6, the second cavity surface 152 faces a −Y-axis direction. The second cavity surface 152 is in contact with the first cavity surface 142. The second cavity surface 152 is, for example, parallel to the first cavity surface 142. A material of the movable mold 150 is, for example, the same as that of the fixed mold 140.

The first plate 160 fixes the fixed mold 140. As shown in FIG. 5, the first plate 160 is provided with a first fixing portion 162 for fixing the fixed mold 140. In the shown example, the first fixing portion 162 has a structure that sandwiches the fixed mold 140. Specifically, the first fixing portion 162 has a fixed portion side engaging portion that engages with a fixed mold side engaging portion (not shown) provided in the fixed mold 140. The fixed portion side engaging portion has a shape overhanging the fixed mold side engaging portion. Alternatively, the first fixing portion 162 may be a bolt, and the fixed mold 140 may be fixed to the first plate 160 by the bolt. A first opening 164 into which the fixed mold 140 is incorporated is formed in the first plate 160. The first opening 164 has a shape corresponding to the fixed mold 140. Sizes of the first opening 164 and the fixed mold 140 may not match, and a gap may be provided between the first opening 164 and the fixed mold 140 in a state in which the fixed mold 140 is incorporated in the first opening 164. In this case, the first opening 164 may not have a shape corresponding to the fixed mold 140.

The first plate 160 has a first facing surface 166. The first opening 164 is formed in the first facing surface 166. The first facing surface 166 is a surface facing the second plate 170. In the example shown in FIG. 6, the first facing surface 166 faces the +Y-axis direction. The first facing surface 166 is, for example, flush with the first cavity surface 142 of the fixed mold 140.

As shown in FIG. 5, the first plate 160 is provided with first fitting portions 168. In the shown example, the first fitting portions 168 are concave portions formed in the first facing surface 166. The first fitting portions 168 are provided, for example, at four corners of the first facing surface 166. The first fitting portions 168 are fitted to corresponding second fitting portions 178 provided on the second plate 170.

A material of the first plate 160 is, for example, a metal such as a SC material containing carbon and steel, a ceramic, or a resin. Examples of the SC material used for the first plate 160 include S55C, S50C, and S45C. Hardness of the fixed mold 140 is, for example, greater than hardness of the first plate 160.

The second plate 170 fixes the movable mold 150. As shown in FIG. 5, the second plate 170 is provided with a second fixing portion 172 for fixing the movable mold 150. The second fixing portion 172 sandwiches, for example, the movable mold 150. The second fixing portion 172 has a structure the same as that of the first fixing portion 162. A second opening 174 into which the movable mold 150 is fitted is formed in the second plate 170. The second opening 174 has a shape corresponding to the movable mold 150. The second plate 170 is separated from the first plate 160. Sizes of the second opening 174 and the movable mold 150 may not match, and a gap may be provided between the second opening 174 and the movable mold 150 in a state in which the movable mold 150 is incorporated in the second opening 174. In this case, the second opening 174 may not have a shape corresponding to the movable mold 150.

The second plate 170 has a second facing surface 176. The second opening 174 is formed in the second facing surface 176. The second facing surface 176 is a surface facing the first plate 160. The second facing surface 176 is, for example, parallel to the first facing surface 166. In the example shown in FIG. 6, the second facing surface 176 faces the −Y-axis direction. The second cavity surface 152 of the movable mold 150 is located closer to the fixed mold 140 than the second facing surface 176. In the shown example, the second cavity surface 152 is in contact with the fixed mold 140.

As shown in FIG. 5, the second plate 170 is provided with the second fitting portions 178. In the shown example, the second fitting portions 178 are convex portions provided on the second facing surface 176. The second fitting portions 178 are provided, for example, at four corners of the second facing surface 176. The second fitting portions 178 are fitted to the corresponding first fitting portions 168 provided on the first plate 160. Although not shown, the first fitting portions 168 may be convex portions provided on the first facing surface 166, and the second fitting portions 178 may be concave portions formed at the second facing surface 176.

A material of the second plate 170 is, for example, the same as that of the first plate 160. Hardness of the movable mold 150 is, for example, greater than hardness of the second plate 170. In the embodiment, the hardness refers to Vickers hardness (HV).

As shown in FIG. 6, the substrate 180 is attached to, for example, the movable mold 150. The substrate 180 is fixed to, for example, the second plate 170. The substrate 180 is fitted into, for example, the second opening 174. In the shown example, an ejector pin 182 is attached to the substrate 180. The ejector pin 182 defines, for example, a part of the cavity 52. The substrate 180 advances and retracts with respect to the movable mold 150. The ejector pin 182 discharges the molded product from the cavity 52.

The first support plate 190 supports the fixed mold 140. The first support plate 190 is provided between the fixed mold 140 and the barrel case 121. The nozzle contact portion 90*a* penetrates the first support plate 190, the first plate 160, and the fixed mold 140.

The second support plate 192 supports the second plate 170 and the substrate 180. The second support plate 192 is provided between the second plate 170 and the substrate 180, and the mold clamping unit 30. In the shown example, the ball screw unit 34 penetrates the second support plate 192.

Figures 7, 8:
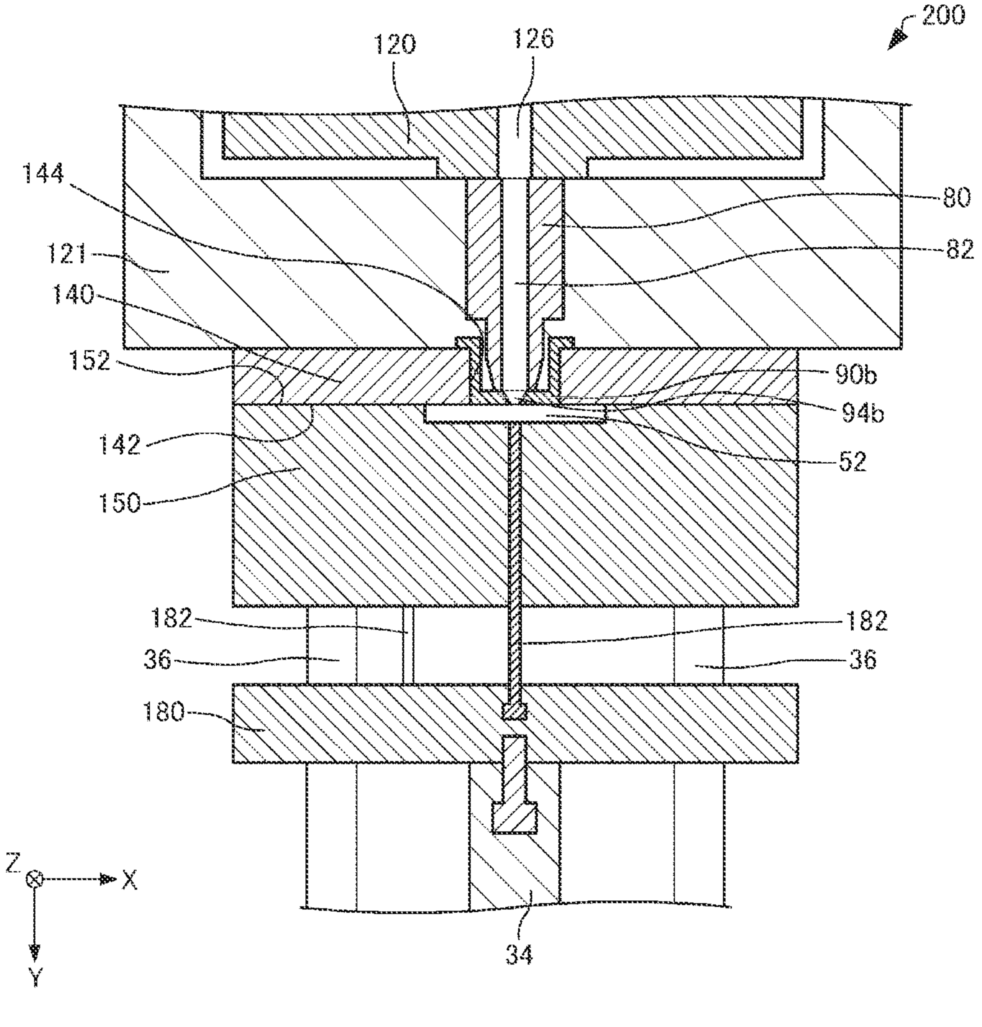
FIG. 7 is a perspective view schematically showing a fixed mold and a movable mold according to the embodiment.
FIG. 8 is a cross-sectional view schematically showing an injection molding device according to the embodiment.

Here, FIG. 7 is a perspective view schematically showing the fixed mold 140 and the movable mold 150. FIG. 8 is a cross-sectional view schematically showing the fixed mold 140 and the movable mold 150 attached to an injection molding device 200.

The fixed mold 140 and the movable mold 150 are attached to the injection molding device 200 as shown in FIG. 8 in a first state in which the fixed mold 140 is not fixed to the first plate 160 and the movable mold 150 is not fixed to the second plate 170 as shown in FIG. 7. Further, the fixed mold 140 and the movable mold 150 are attached to the injection molding device 100 as shown in FIG. 6 in a second state in which the fixed mold 140 is fixed to the first plate 160 and the movable mold 150 is fixed to the second plate 170 as shown in FIG. 5.

The injection molding device 200 is an injection molding device different from the injection molding device 100. The injection molding device 100 is, for example, an injection molding device larger than the injection molding device 200. A mold clamping force of the injection molding device 100 is, for example, 30 tons or more. The injection molding device 200 is, for example, an injection molding device smaller than the injection molding device 100. A mold clamping force of the injection molding device 200 is, for example, 20 tons or less. The mold clamping force of the injection molding device 200 may be 10 tons or less.

The injection molding device 100 and the injection molding device 200 may have the same configuration and different sizes, or may have different configurations and different sizes. Although not shown, for example, the injection molding device 100 may include an in-line screw, and the injection molding device 200 may include a flat screw.

The first plate 160 and the second plate 170 are sized for attachment to the injection molding device 100. The first plate 160 and the second plate 170 have, for example, standardized sizes. The fixed mold 140 and the movable mold 150 are not attached to the injection molding device 100 in the first state.

The fixed mold 140 and the movable mold 150 are sized for attachment to the injection molding device 200. The fixed mold 140 and the movable mold 150 are not attached to the injection molding device 200 in the second state.

As shown in FIGS. 6 and 8, the nozzle contact portion 90*a* in contact with the nozzle 80 of the injection molding device 100 and a nozzle contact portion 90*b* in contact with the nozzle 80 of the injection molding device 200 are interchangeably incorporated in the opening 144 formed in the fixed mold 140. The nozzle contact portions 90*a* and 90*b* may be fixed to the opening 144 by bolts. As shown in FIG. 8, the nozzle contact portion 90*b* corresponds to a shape of the nozzle 80 of the injection molding device 200. A flow path 94*b* is formed in the nozzle contact portion 90*b* and allows the nozzle hole 82 to communicate with the cavity 52. The molding material is injected into the cavity 52 from the nozzle hole 82 through the flow path 94*b*. The sizes of the opening 144 and the nozzle contact portions 90*a* and 90*b* may not match, and a gap may be provided between the opening 144 and the nozzle contact portion 90*a* in a state in which the nozzle contact portion 90*a* is incorporated in the opening 144, or a gap may be provided between the opening 144 and the nozzle contact portion 90*b* in a state in which the nozzle contact portion 90*b* is incorporated in the opening 144.

The shape of the nozzle 80 of the injection molding device 100 is different from the shape of the nozzle 80 of the injection molding device 200 as shown in FIGS. 6 and 8. Both the nozzle 80 of the injection molding device 100 and the nozzle 80 of the injection molding device 200 may be hot runners or cold runners, or one of the nozzles may be a hot runner and the other may be a cold runner.

Although not shown, the first cavity surface 142 of the fixed mold 140 may be located closer to the movable mold 150 than the first facing surface 166 of the first plate 160, and the second cavity surface 152 of the movable mold 150 may be flush with the second facing surface 176 of the second plate 170. The first cavity surface 142 may be located closer to the movable mold 150 than the first facing surface 166, and the second cavity surface 152 may be located closer to the fixed mold 140 than the second facing surface 176. Therefore, in the second state, the mold 50 may satisfy at least one of the following first condition and second condition.

The first condition is that the first cavity surface 142 of the fixed mold 140 is located closer to the movable mold 150 than the first facing surface 166 of the first plate 160 facing the second plate 170.

The second condition is that the second cavity surface 152 of the movable mold 150 is located closer to the fixed mold 140 than the second facing surface 176 of the second plate 170 facing the first plate 160.

1.4. Functions and Effects

The mold 50 includes the fixed mold 140, the movable mold 150 facing the fixed mold 140, the first plate 160 in which the first opening 164, in which the fixed mold 140 is incorporated, is formed and which fixes the fixed mold 140, and the second plate 170 in which the second opening 174, in which the movable mold 150 is incorporated, is formed and which fixes the movable mold 150. The fixed mold 140 and the movable mold 150 define the cavity 52. The fixed mold 140 and the movable mold 150 are sized for attachment to the injection molding device 200 as a first injection molding device. The first plate 160 and the second plate 170 are sized for attachment to the injection molding device 100 as a second injection molding device different from the injection molding device 200. Therefore, in the mold 50, the fixed mold 140 and the movable mold 150 used in the injection molding device 200 can be used in the injection molding device 100.

In the mold 50, the fixed mold 140 and the movable mold 150 are used by being attached to the injection molding device 200 in the first state in which the fixed mold 140 is not fixed to the first plate 160 and the movable mold 150 is not fixed to the second plate 170, and are used by being attached to the injection molding device 100 in the second state in which the fixed mold 140 is fixed to the first plate 160 and the movable mold 150 is fixed to the second plate 170. Therefore, in the mold 50, the fixed mold 140 and the movable mold 150 used in the injection molding device 200 can be used in the injection molding device 100.

In the mold 50, the shape of the nozzle 80 of the injection molding device 200 as a first nozzle is different from the shape of the nozzle 80 of the injection molding device 100 as a second nozzle. In the fixed mold 140, the opening 144 is formed in which the nozzle contact portion **90*b* and the nozzle e contact portion 90*a* are interchangeably incorporated. The nozzle contact portion 90*b* serves as a first nozzle contact portion that is in contact with the nozzle 80 of the injection molding device 200 and corresponds to the shape of the nozzle 80. The nozzle contact portion 90*a* serves as a second nozzle contact portion that is in contact with the nozzle 80 of the injection molding device 100 and corresponds to the shape of the nozzle 80. Therefore, in the mold 50, even when the shape of the nozzle 80 of the injection molding device 100 is different from the shape of the nozzle 80 of the injection molding device 200, the fixed mold 140 and the movable mold 150 used in the injection molding device 200 can be used in the injection molding device 100**.

In the mold 50, the hardness of the fixed mold 140 is greater than the hardness of the first plate 160, and the hardness of the movable mold 150 is greater than the hardness of the second plate 170. Therefore, in the mold 50, the first plate 160 and the second plate 170 can be manufactured at low cost. Since the first plate 160 and the second plate 170 do not come into contact with each other during mold clamping, the hardness can be reduced.

In the second state, the mold 50 satisfies at least one of the first condition and the second condition as described above. Therefore, in the mold 50, it is possible to prevent the first plate 160 and the second plate 170 from coming into contact with each other during the mold clamping. Accordingly, it is possible to prevent damage due to collision between the first plate 160 and the second plate 170.

2. Injection Molding Device Evaluation Method

Figure 9:
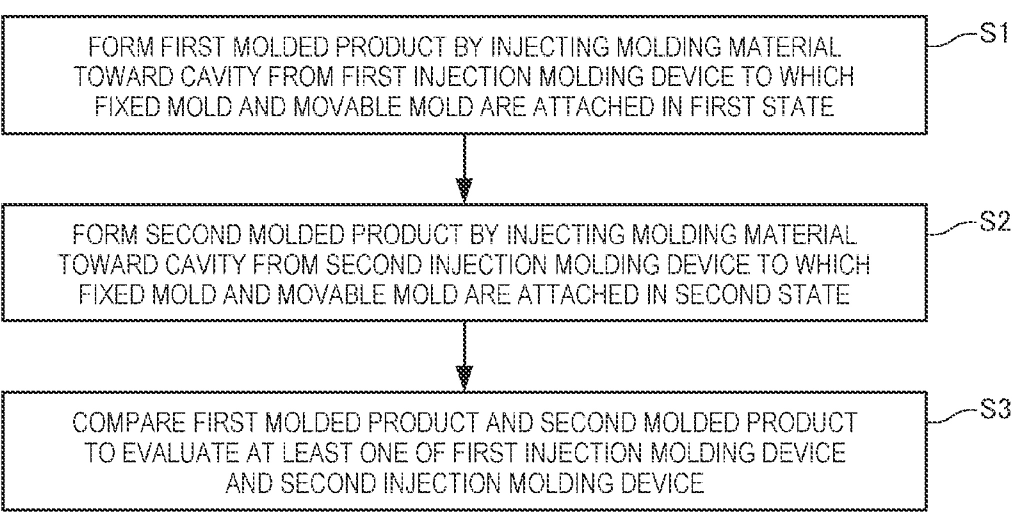
FIG. 9 is a flowchart showing an injection molding device evaluation method according to the embodiment.

Next, an injection molding device evaluation method according to the embodiment will be described with reference to the drawings. FIG. 9 is a flowchart showing the injection molding device evaluation method according to the embodiment.

First, as shown in FIG. 9, in step S1, a first molded product is formed by injecting a molding material toward the cavity 52 from the injection molding device 200 to which the fixed mold 140 and the movable mold 150 are attached in the first state.

Specifically, as shown in FIG. 8, the nozzle contact portion **90*b* is fitted into the opening 144 of the fixed mold 140. Then, in the first state in which the fixed mold 140 is not fixed to the first plate 160 and the movable mold 150 is not fixed to the second plate 170, the fixed mold 140 and the movable mold 150 are attached to the injection molding device 200. Thereafter, the injection molding device 200 is driven to inject the molding material toward the cavity 52** to form the first molded product.

Next, in step S2, a second molded product is formed by injecting a molding material toward the cavity 52 from the injection molding device 100 to which the fixed mold 140 and the movable mold 150 are attached in the second state.

Specifically, the fixed mold 140 and the movable mold 150 are removed from the injection molding device 200. The fixed mold 140 is fixed to the first plate 160. The movable mold 150 is fixed to the second plate 170. The nozzle contact portion **90*b* is removed from the opening 144 of the fixed mold 140, and the nozzle contact portion 90*a* is fitted into the opening 144 as shown in FIG. 6. Then, in the second state in which the fixed mold 140 is fixed to the first plate 160 and the movable mold 150 is fixed to the second plate 170, the fixed mold 140 and the movable mold 150 are attached to the injection molding device 100. Thereafter, the injection molding device 100 is driven to inject the molding material toward the cavity 52** to form the second molded product.

Next, in step S3, the first molded product molded in step S1 and the second molded product molded in step S2 are compared to evaluate at least one of the injection molding device 100 and the injection molding device 200.

Specifically, mass, a volume, a tensile strength, a quality, a shape, and the like of the first molded product and the second molded product are compared. Then, specifications of the injection molding device 100 and the injection molding device 200 are evaluated based on the comparison. For example, when the tensile strength of the second molded product is larger than the tensile strength of the first molded product, the specification of the injection molding device 200 is higher than the specification of the injection molding device 100. The tensile strength results from heat that the injection molding devices 100 and 200 imparts to a raw material.

The injection molding device evaluation method according to the embodiment includes forming the first molded product by injecting the molding material toward the cavity 52 from the injection molding device 200 to which the fixed mold 140 and the movable mold 150 are attached in the first state, forming the second molded product by injecting the molding material toward the cavity 52 from the injection molding device 100 to which the fixed mold 140 and the movable mold 150 are attached in the second state, and evaluating at least one of the injection molding device 100 and the injection molding device 200 by comparing the first molded product and the second molded product. Therefore, the first molded product and the second molded product can be molded using the same fixed mold 140 and movable mold 150. Accordingly, at least one of the injection molding device 100 and the injection molding device 200 can be more accurately evaluated.

For example, when the first molded product and the second molded product are molded using separate fixed molds and movable molds, the quality and the like of the first molded product and the second molded product are affected by the fixed mold and the movable mold. Therefore, it is difficult to evaluate the injection molding device itself.

3. Material Supplied to Injection Molding Device

In the injection molding device 100 described above, the material supplied from the material supply unit 10 is the ABS resin without limitation.

Examples of the material supplied from the material supply unit 10 include materials having various materials such as a thermoplastic material, a metal material, and a ceramic material as main materials. Here, the "main material" means a material serving as a center forming a shape of a molded product molded by an injection molding device, and means a material occupying a content of 50 mass % or more in the molded product. The materials described above include those acquired by melting the main materials alone, and those acquired by melting a part of components contained together with the main materials into a paste form.

As the thermoplastic material, for example, a thermoplastic resin can be used. Examples of the thermoplastic resin include general-purpose engineering plastics and super engineering plastics.

Examples of the general-purpose engineering plastic include polypropylene (PP), polyethylene (PE), polyacetal (POM), polyvinyl chloride (PVC), polyamide (PA), polylactic acid (PLA), polyphenylene sulfide (PPS), polycarbonate (PC), modified polyphenylene ether, polybutylene terephthalate, and polyethylene terephthalate.

Examples of the super engineering plastic include polysulfone (PSU), polyethersulfone (PES), polyphenylene sulfide (PPS), polyarylate (PAR), polyimide (PI), polyamideimide (PAI), polyetherimide (PEI), and polyether ether ketone (PEEK).

Additives such as a wax, a flame retardant, an antioxidant, and a heat stabilizer may be mixed into the thermoplastic material in addition to a pigment, a metal, and a ceramic. In the plasticizing unit 60, the thermoplastic material is plasticized and converted into a molten state by rotation of the flat screw 110 and heating of the heater 130. The molding material generated in this way is deposited from the nozzle 80 and then cured due to a decrease in temperature. It is desirable that the thermoplastic material be heated to a temperature equal to or higher than a glass transition point thereof and injected from the nozzle 80 in a state of being completely melted.

In the plasticizing unit 60, for example, a metal material may be used as the main material instead of the thermoplastic material described above. In this case, it is desirable that a powder material acquired by powdering the metal material be mixed with a component that melts when the molding material is generated, and the mixture is charged into the plasticizing unit 60.

Examples of the metal material include a single metal such as magnesium (Mg), iron (Fe), cobalt (Co), chromium (Cr), aluminum (Al), titanium (Ti), copper (Cu), and nickel (Ni), or an alloy containing one or more of these metals, maraging steel, stainless steel, cobalt chromium molybdenum, a titanium alloy, a nickel alloy, an aluminum alloy, a cobalt alloy, and a cobalt chromium alloy.

In the plasticizing unit 60, a ceramic material can be used as the main material instead of the metal material described above. Examples of the ceramic material include an oxide ceramic such as silicon dioxide, titanium dioxide, aluminum oxide, and zirconium oxide, and a non-oxide ceramic such as aluminum nitride.

A powder material of the metal material or the ceramic material supplied from the material supply unit 10 may be a mixed material in which a plurality of types of powder of a single metal or powder of an alloy and powder of a ceramic material are mixed. In addition, the powder material of the metal material or the ceramic material may be coated with, for example, the above-described thermoplastic resin or another thermoplastic resin. In this case, in the plasticizing unit 60, the thermoplastic resin may be melted to exhibit fluidity.

For example, a solvent can be added to the powder material of the metal material or the ceramic material supplied from the material supply unit 10. Examples of the solvent include: water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate.

In addition, for example, a binder may be added to the powder material of the metal material or the ceramic material supplied from the material supply unit 10. Examples of the binder include an acrylic resin, an epoxy resin, a silicone resin, a cellulose-based resin, other synthetic resins, PLA, PA, PPS, PEEK, and other thermoplastic resins.

The embodiment and modification described above are merely examples, and the present disclosure is not limited thereto. For example, each embodiment and each modification can be combined as appropriate.

The present disclosure includes a configuration substantially the same as the configurations described in the embodiment, for example, a configuration having the same functions, methods, and results, or a configuration having the same objects and effects. In addition, the present disclosure includes a configuration in which an unnecessary portion of the configurations described in the embodiment is replaced. The present disclosure includes a configuration having the same action and effect as the configuration described in the embodiment, or a configuration capable of achieving the same object. The present disclosure includes a configuration in which a known technique is added to the configuration described in the embodiment.

The following contents are derived from the above embodiment and modification.

One aspect of a mold includes: a fixed mold; a movable mold facing the fixed mold; a first plate having a first opening into which the fixed mold is incorporated and fixing the fixed mold; and a second plate having a second opening into which the movable mold is incorporated and fixing the movable mold. The fixed mold and the movable mold define a cavity. The fixed mold and the movable mold are sized for attachment to a first injection molding device. The first plate and the second plate are sized for attachment to a second injection molding device different from the first injection molding device.

According to the mold, the fixed mold and movable mold used in the first injection molding device can be used in the second injection molding device.

In one aspect of the mold, the fixed mold and the movable mold may be used by being attached to the first injection molding device in a first state in which the fixed mold is not fixed to the first plate and the movable mold is not fixed to the second plate, and may be used by being attached to the second injection molding device in a second state in which the fixed mold is fixed to the first plate and the movable mold is fixed to the second plate.

According to the mold, the fixed mold and movable mold used in the first injection molding device can be used in the second injection molding device.

In one aspect of the mold, a shape of a first nozzle of the first injection molding device and a shape of a second nozzle of the second injection molding device may be different from each other, and an opening in which a first nozzle contact portion and a second nozzle contact portion are interchangeably incorporated may be formed in the fixed mold, the first nozzle contact portion being in contact with the first nozzle and corresponding to the shape of the first nozzle, and the second nozzle contact portion being in contact with the second nozzle and corresponding to the shape of the second nozzle.

According to the mold, even when the shape of the second nozzle is different from the shape of the first nozzle, the fixed mold and the movable mold used in the first injection molding device can be used in the second injection molding device.

In one aspect of the mold, hardness of the fixed mold may be greater than hardness of the first plate, and hardness of the movable mold may be greater than hardness of the second plate.

According to the mold, the first plate and the second plate can be manufactured at low cost.

In one aspect of the mold, in the second state, at least one of a first condition and a second condition described below may be satisfied. The first condition: a cavity surface of the fixed mold is located closer to the movable mold than a first facing surface of the first plate facing the second plate. The second condition: a cavity surface of the movable mold is located closer to the fixed mold than a second facing surface of the second plate facing the first plate.

According to the mold, it is possible to prevent the first plate and the second plate from coming into contact with each other during mold clamping.

One aspect of an injection molding device evaluation method includes: forming a first molded product by injecting a molding material toward the cavity from the first injection molding device to which the fixed mold and the movable mold are attached in the first state; forming a second molded product by injecting a molding material toward the cavity from the second injection molding device to which the fixed mold and the movable mold are attached in the second state; and evaluating at least one of the first injection molding device and the second injection molding device by comparing the first molded product and the second molded product.

According to the injection molding device evaluation method, at least one of the first injection molding device and the second injection molding device can be more accurately evaluated.

What is claimed is:

1. A mold comprising:

a fixed mold;

a movable mold facing the fixed mold;

a first plate having a first opening into which the fixed mold is incorporated and fixing the fixed mold; and a second plate having a second opening into which the movable mold is incorporated and fixing the movable mold, wherein the fixed mold and the movable mold define a cavity, in a first state, in which the fixed mold is not fixed to the first plate and the movable mold is not fixed to the second plate, the fixed mold and the movable mold are sized for attachment to a first injection molding device, and in a second state, in which the fixed mold is fixed to the first plate and the movable mold is fixed to the second plate, the first plate and the second plate are sized for attachment to a second injection molding device different from the first injection molding device.

2. The mold according to claim 1, wherein the fixed mold and the movable mold are used by being attached to the first injection molding device in the first state, and used by being attached to the second injection molding device in the second state.

3. The mold according to claim 1, wherein a shape of a first nozzle of the first injection molding device and a shape of a second nozzle of the second injection molding device are different from each other, and a third opening in which a first nozzle contact portion and a second nozzle contact portion are interchangeably incorporated is formed in the fixed mold, the first nozzle contact portion being in contact with the first nozzle and corresponding to the shape of the first nozzle, and the second nozzle contact portion being in contact with the second nozzle and corresponding to the shape of the second nozzle.

4. The mold according to claim 1, wherein hardness of the fixed mold is greater than hardness of the first plate, and hardness of the movable mold is greater than hardness of the second plate.

5. The mold according to claim 2, wherein in the second state, at least one of a first condition and a second condition described below is satisfied, the first condition: a cavity surface of the fixed mold is located closer to the movable mold than a first facing surface of the first plate facing the second plate; and a second condition: a cavity surface of the movable mold is located closer to the fixed mold than a second facing surface of the second plate facing the first plate.

* * * * *